Patented Feb. 22, 1927.

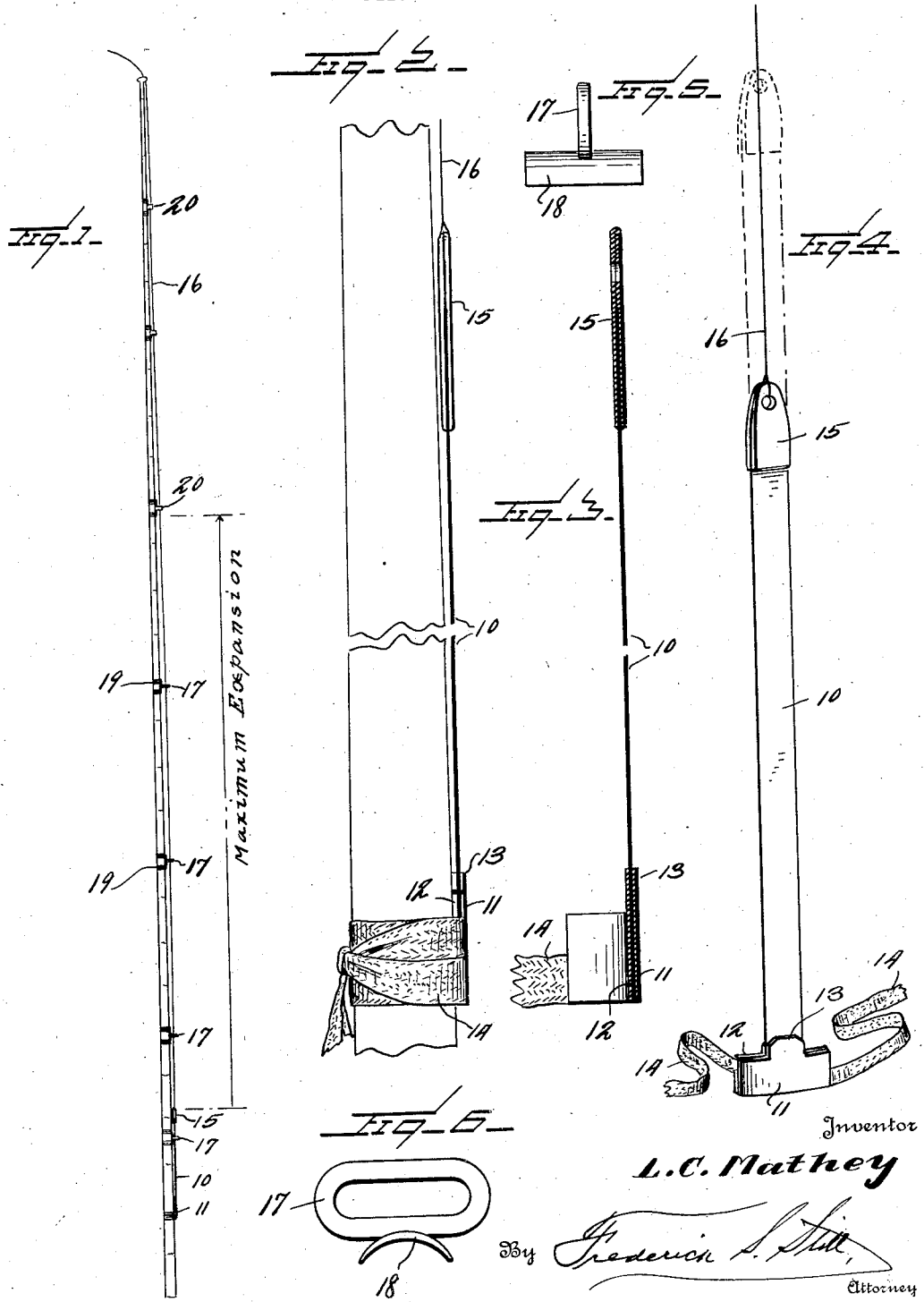

1,618,302

UNITED STATES PATENT OFFICE.

LOUIS C. MATHEY, OF NASHVILLE, TENNESSEE.

STRAIN-APPLYING DEVICE FOR FISHING RODS.

Application filed June 17, 1926. Serial No. 116,627.

This invention relates to devices to be used in connection with fishing rods or poles for the purpose of exerting a strain upon the line when a fish is hooked and the general object of the invention is to provide a very simple and effective device of this character which may be readily applied to a rod and to the line or removed therefrom, which may be carried in the pocket, and which, as before stated, will act to exert a constant tension upon the line after a fish strikes and attempts to run off.

A further object is to provide a device of this character comprising an elastic rubber band preferably flat, though not necessarily so, having at one end means whereby it may be readily tied to and firmly engaged with a fishing rod, and in this connection to provide guides through which the elastic band will successively pass as the elastic band is strained to a greater and greater degree by the struggles of a fish to get away.

A still further object is to provide a device of this character which may be readily clasped by the hand of the angler to thus prevent the elastic expansion of the rubber band and permit the fish to be landed.

Other objects will appear in the course of the following description.

My invention is illustrated in the accompanying drawings wherein:—

Figure 1 is a side view of a fishing rod with my attachment applied thereto and to the fishing line;

Fig. 2 is a fragmentary side elevation of the rod showing the attachment applied thereto and to the line;

Fig. 3 is a vertical sectional view through the attachment;

Fig. 4 is a perspective view of the attachment;

Fig. 5 is a side elevation of one of the eyes through which the elastic band passes;

Fig. 6 is a front elevation of the guides shown in Figure 5.

Referring to these drawings it will be seen that my attachment in essence comprises an elastic band 10 which is preferably relatively flat and has a length of approximately 12" under ordinary circumstances though the band might be either longer or shorter, and may be wider or narrower than illustrated and thinner or thicker, and have any desired shape in cross section.

One end of the band 10 is inserted between two thicknesses 11 and 12 of hard rubber, leather or like material. These two thicknesses of material are each formed with a forwardly projecting ear 13 having a width equal to that of the band and the end of the rubber band is inserted between these two hard rubber or leather members. Also inserted between these layers 11 and 12 are the transversely extending tapes 14. The layers 11 and 12 are preferably pre-formed so as to fit around the pole or rod as shown and when the device is in place the tape is intended to be wrapped around the rod adjacent the butt end thereof and tied in any suitable manner so as to hold one end of the band securely attached to the pole or rod.

The other end of the band 10 is inserted between two layers 15 of hard rubber, leather or like material. The layers 11 and 12 and the two layers of material 15 are cemented or otherwise firmly attached to the elastic band 10 over a relatively large area so that the parts cannot become disconnected. The terminal 15 is apertured or otherwise formed so as to engage with the extremity of the line 16. Preferably a guide 17 will be disposed upon the rod, this guide having a relatively wide slot through which the rubber band passes and this guide is preferably disposed on that portion of the rod which would be overlaid by the rubber band when the latter is in its natural contracted condition.

Along the rod at intervals there are disposed other guides 17 which have the same form as the first named guide 17, each guide being provided with a transversely extending slot large enough to receive the rubber band and provided with a base 18 which fits over the rod and may be engaged therewith by seizing 19.

The rubber band will, of course, have a maximum expansion beyond which it cannot be stretched and beyond this point of maximum expansion ordinary guide eyes 20 will be disposed and through which the line will pass, the line, of course, passing out at the extremity of the rod through an ordinary tip as is usual. Obviously, the heavier and longer the rubber band, the greater will be the number of the special guides 17.

While I have illustrated certain details of construction which I regard as preferable, I do not wish to be limited to these. The eyes will preferably be of aluminum though not necessarily so, as brass might be used. One of the advantages of this appliance is that it does away with the necessity of a reel and exerts an elastic tension on the line after the fish strikes which keeps the line at all times taut and exerts a constant pull on the fish. Thus, when a fish strikes and is hooked and resists, the line advances and retracts in complete correspondence with the movement of the fish and by keeping a constant tension upon the line whether the fish moves away from the angler or towards him, it is impossible for the fish to shake out or dislodge the hook from its mouth.

This device may be made in various shapes and sizes and may have a tensile strength or holding capacity from a minimum up to thirty pounds or more if desired which is quite sufficient for all game fishing with flies, minnows, artificial bait or other devices. By keeping a constant elastic strain upon the line the fish is prevented from pulling out the line indefinitely as is likely where there is no elastic tension on the line, and the captive fish is prevented from darting into roots, rocks or weeds.

There is another feature of this invention which is of great advantage, that in landing a fish or in case it be not desired to utilize the elastic band it is only necessary for the sportsman to place his left hand upon the band, preferably near the outer end or tip thereof, and grasp the rod. In this case, of course, the elastic band will not play any part nor permit the line to be drawn outward from the rod as would otherwise be the case. At any time the action of the elastic band may be stopped or limited by grasping the rod and the elastic band either at the end of the band or inward of the end. Inasmuch as this device is placed upon the exterior surface of the rod it may be readily attached to the rod or removed therefrom and it is at all times under control by the fisherman.

I claim:—

1. A fishing appliance comprising a flat elastic band having tapes attached to its rear end whereby it may be attached to a fishing rod adjacent the butt thereof, the other end of the elastic band having a member attached thereto of two thicknesses of relatively hard material between which the extremity of the elastic band is disposed, the end of the member being perforated for engagement with a fishing line.

2. A fishing appliance comprising a flat elastic band having tapes attached to its rear end whereby it may be attached to a fishing rod adjacent the butt end thereof, the other end of the elastic band having a member attached thereto of two thicknesses of relatively hard material between which the extremity of the elastic band is disposed, the end of the member being perforated for engagement with a fishing line, and means for engaging the other end of the band to the rod comprising two thicknesses of relatively hard material transversely curved to fit over the rod and having laterally extending tapes applied thereto.

3. The combination with a fishing rod, of a strain appliance thereon consisting of an elastic band extending longitudinally of the rod having means at one end whereby it may be connected to the rod, a guide mounted upon the rod and through which the band normally passes, the guide having a slot for the accommodation of the band, and a plurality of guides mounted upon the rod and through which the line normally passes, each of said guides having a transversely extending slot large enough to receive the elastic band when the latter is expanded.

In testimony whereof I affix my signature.

LOUIS C. MATHEY.